US010048746B2

(12) United States Patent
Gonzalez Solis

(10) Patent No.: US 10,048,746 B2
(45) Date of Patent: Aug. 14, 2018

(54) INTERACTIVE DIGITAL ENTERTAINMENT KIOSK

(71) Applicant: Eduardo A. Gonzalez Solis, Arleta, CA (US)

(72) Inventor: Eduardo A. Gonzalez Solis, Arleta, CA (US)

(*) Notice: Subject to any disclaimer, the term of this patent is extended or adjusted under 35 U.S.C. 154(b) by 0 days.

(21) Appl. No.: 15/082,305

(22) Filed: Mar. 28, 2016

(65) Prior Publication Data

US 2016/0284059 A1    Sep. 29, 2016

Related U.S. Application Data

(60) Provisional application No. 62/139,603, filed on Mar. 27, 2015.

(51) Int. Cl.
| | | |
|---|---|---|
| *G06T 3/60* | (2006.01) | |
| *G06F 3/01* | (2006.01) | |
| *H04N 1/00* | (2006.01) | |
| *G06F 1/16* | (2006.01) | |

(52) U.S. Cl.
CPC .............. *G06F 3/01* (2013.01); *G06F 1/1632* (2013.01); *H04N 1/00289* (2013.01)

(58) Field of Classification Search
CPC ...... G06F 3/01; G06F 1/1632; H04N 1/00289
See application file for complete search history.

(56) References Cited

U.S. PATENT DOCUMENTS

| 7,212,308 | B2 | 5/2007 | Morgan | |
|---|---|---|---|---|
| 8,116,081 | B2 | 2/2012 | Crick, Jr. | |
| 2006/0092284 | A1 | 5/2006 | Goodman et al. | |
| 2009/0319381 | A1* | 12/2009 | Armstrong | G06Q 20/204 705/15 |
| 2015/0142429 | A1* | 5/2015 | Ondeck | G10L 19/00 704/231 |

* cited by examiner

*Primary Examiner* — Samantha (Yuehan) Wang
(74) *Attorney, Agent, or Firm* — Morrison & Foerster LLP

(57) ABSTRACT

The disclosure is directed to an interactive entertainment kiosk that is immersive, intuitive to use, and provides significant and varied functionality to users. In particular, the kiosk can provide a photo booth mode, a karaoke mode, a virtual reality mode, and/or a game mode, among other possibilities. Further, switching between modes can be intuitive through the use of touch screens and other input devices. For example, a user can provide input to select a particular electronic device for display, and the display can automatically be set to the proper mode. Further, a display may be mounted on the kiosk via a rotatable display mount, and the display may be automatically rotated to a proper orientation for the selected mode. In some embodiments, the kiosk can provide an immersive experience through the use of light sources that automatically adjust in accordance with audio of the kiosk.

11 Claims, 7 Drawing Sheets

INTERACTIVE DIGITAL ENTERTAINMENT KIOSK

CROSS REFERENCE TO RELATED APPLICATION

This application claims the benefit under 35 USC 119(e) of U.S. Patent Application No. 62/139,603, filed Mar. 27, 2015, the contents of which are incorporated herein by reference in its entirety for all purposes.

FIELD OF THE DISCLOSURE

The present disclosure relates generally to methods and apparatus of an entertainment kiosk.

BACKGROUND OF THE DISCLOSURE

Electronic devices may be equipped with a camera and display to capture and display photos/videos of users. However, such devices either lack ease of use, durability, and/or portability. Further, such devices often offer only limited functionality to users.

SUMMARY OF THE DISCLOSURE

Embodiments of the disclosure are directed to an interactive entertainment kiosk that is immersive, intuitive to use, and provides significant and varied functionality to users. In particular, the kiosk can provide a photo booth mode, a karaoke mode, virtual reality mode, and/or a game mode, among other possibilities. Further, switching between modes can be intuitive through the use of touch screens and other input devices. For example, a user can provide input (e.g., at a touchscreen) to select a particular electronic device for display (e.g., a video game console), and the display can automatically be set to the proper mode. Further, a display may be mounted on the kiosk via a rotatable display mount, and the display may be automatically rotated to a proper orientation for the selected mode (e.g., landscape for a video game mode, portrait for a photo booth mode, etc.). In some embodiments, the kiosk can provide an immersive experience through the use of light sources that automatically adjust in accordance with audio of the kiosk. For example, lights can change color in accordance with music playing from the kiosk.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Embodiments of the disclosure are directed to an interactive entertainment kiosk that is immersive, intuitive to use, and provides significant and varied functionality to users. In particular, the kiosk can provide a photo booth mode, a karaoke mode, and/or a game mode, among other possibilities. Further, switching between modes can be intuitive through the use of touch screens and other input devices. For example, a user can provide input (e.g., at a touchscreen) to select a particular electronic device for display (e.g., a video game console), and the display can automatically be set to the proper mode. Further, a display may be mounted on the kiosk via a rotatable display mount, and the display may be automatically rotated (e.g., by a motor) to a proper orientation for the selected mode (e.g., landscape for a video game mode, portrait for a photo booth mode, etc.). In some embodiments, the kiosk can provide an immersive experience through the use of light sources that automatically adjust in accordance with audio of the kiosk. For example, lights can change color in accordance with music playing from the kiosk.

Figure 1:
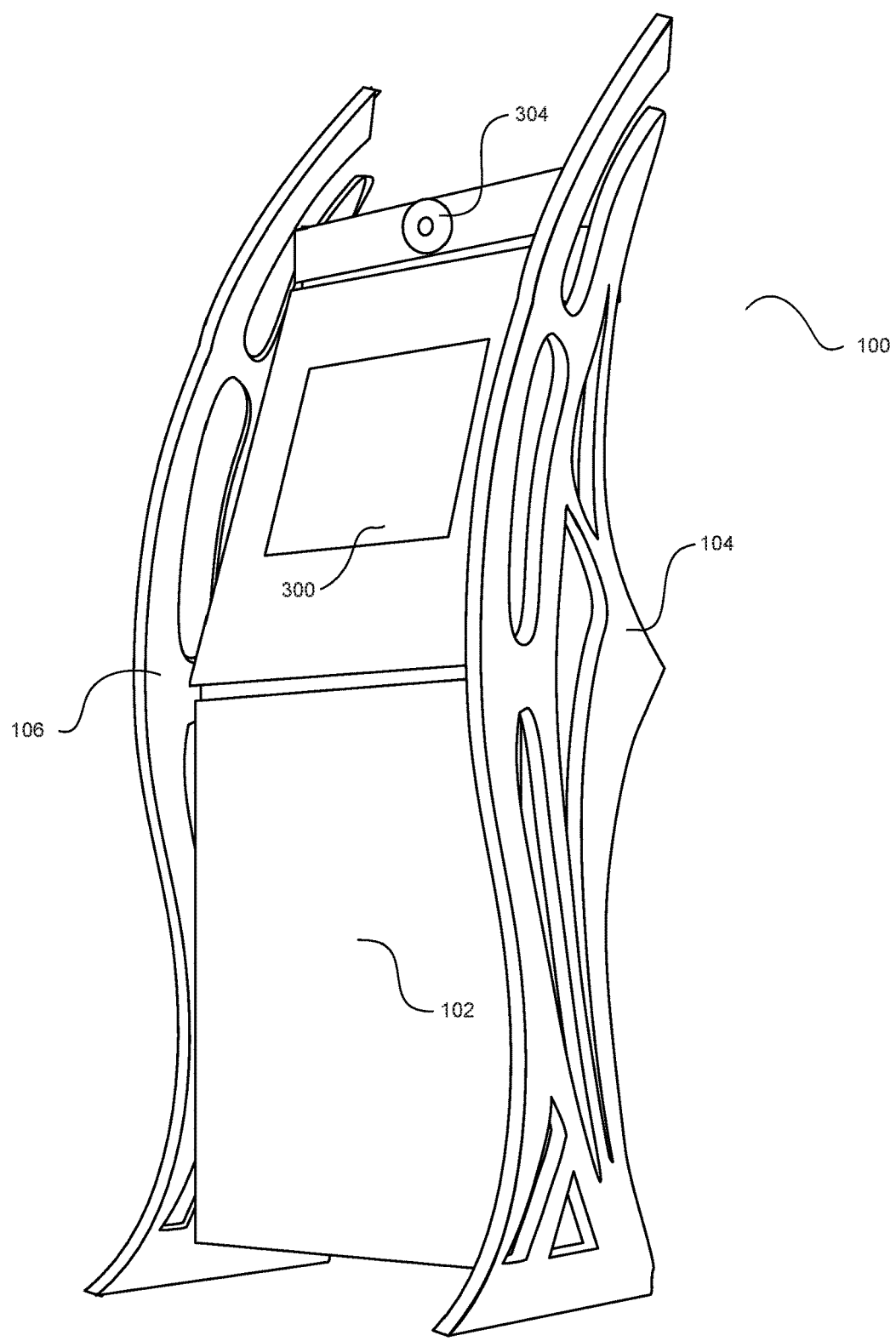
FIG. 1 illustrates a perspective view of an interactive entertainment kiosk in accordance with some embodiments.
Figure 2A:
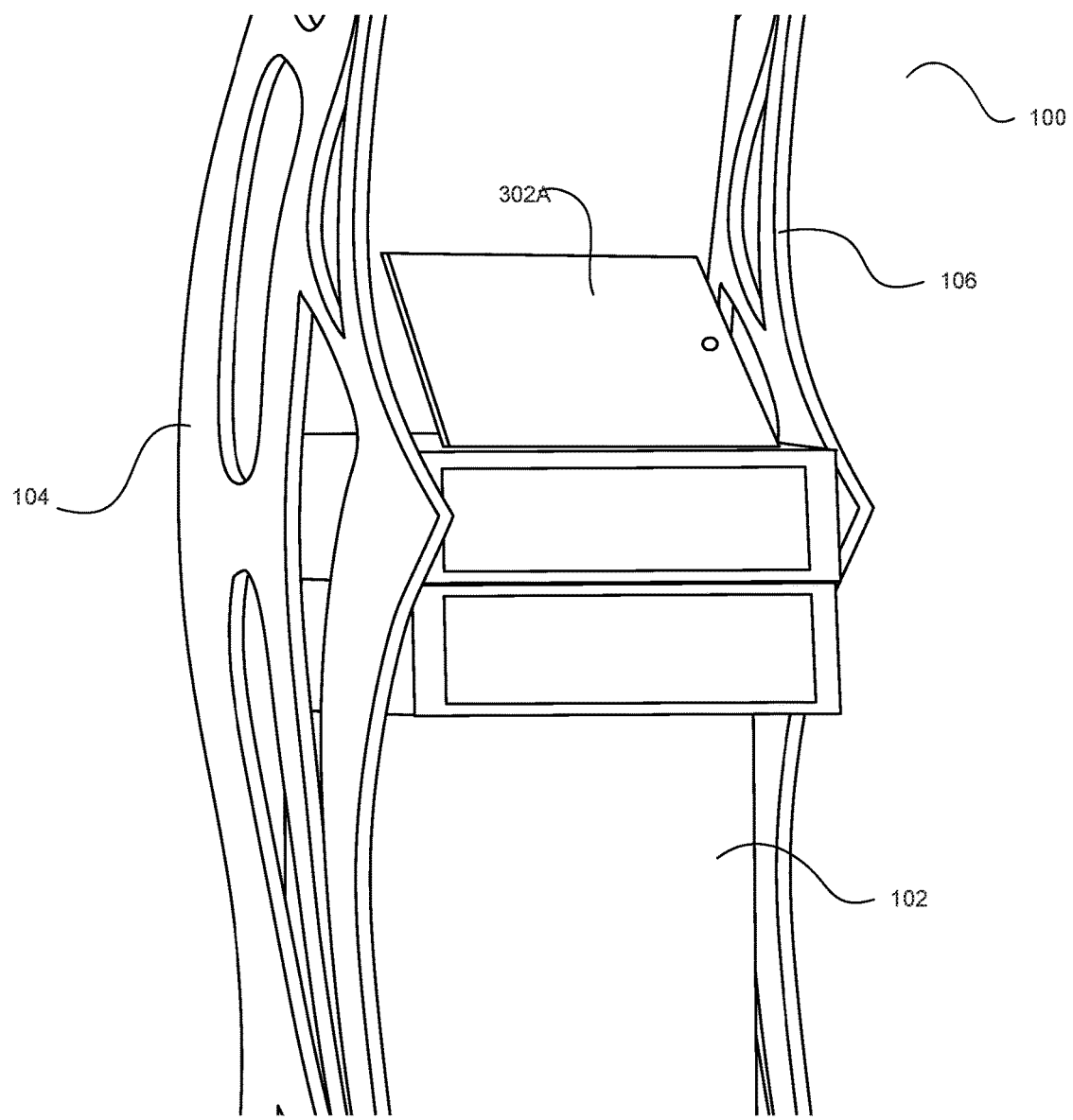
FIGS. 2A-2C illustrate a rear view of an interactive entertainment kiosk in accordance with some embodiments.
Figure 2B:
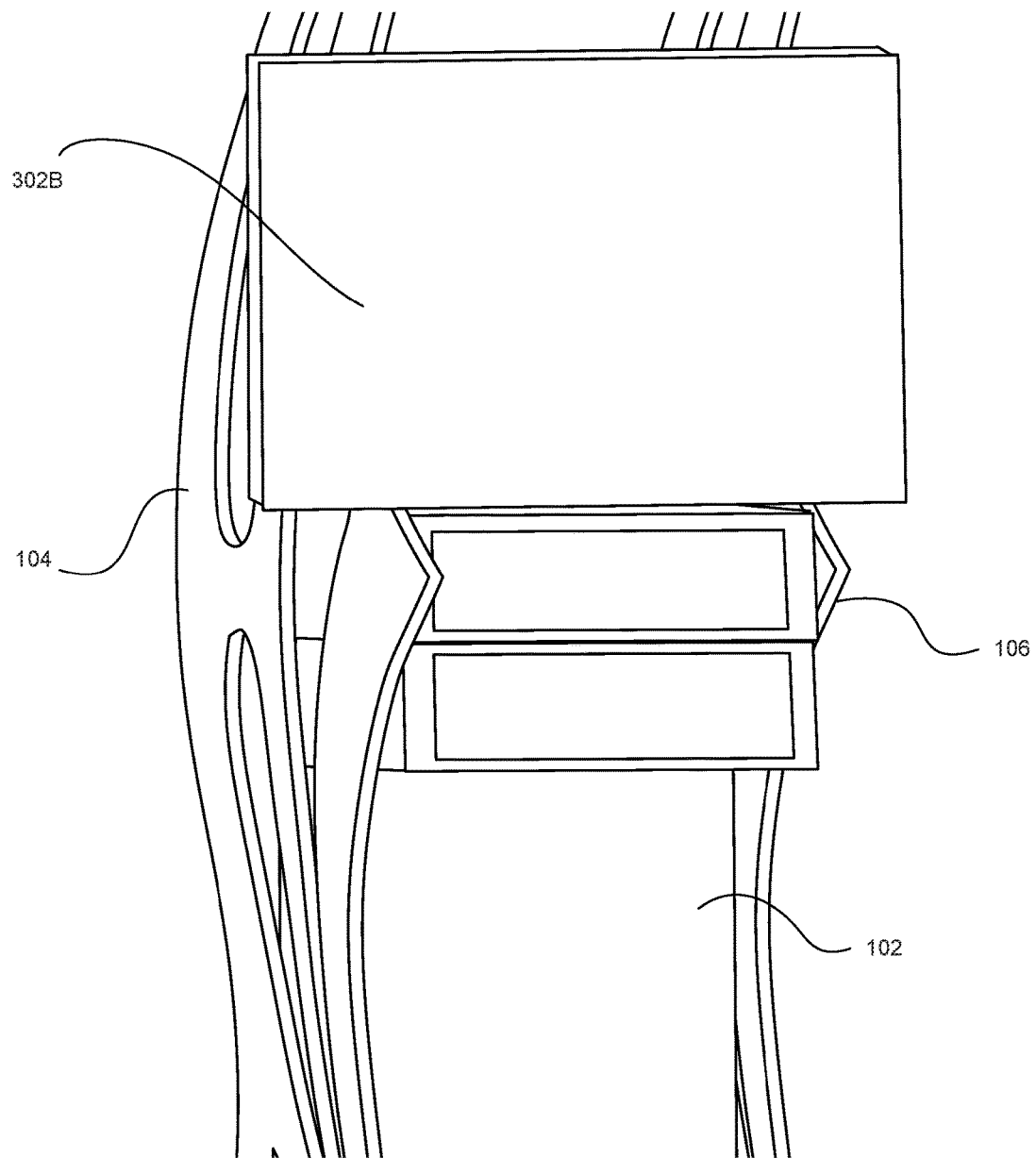
Figure 2C:
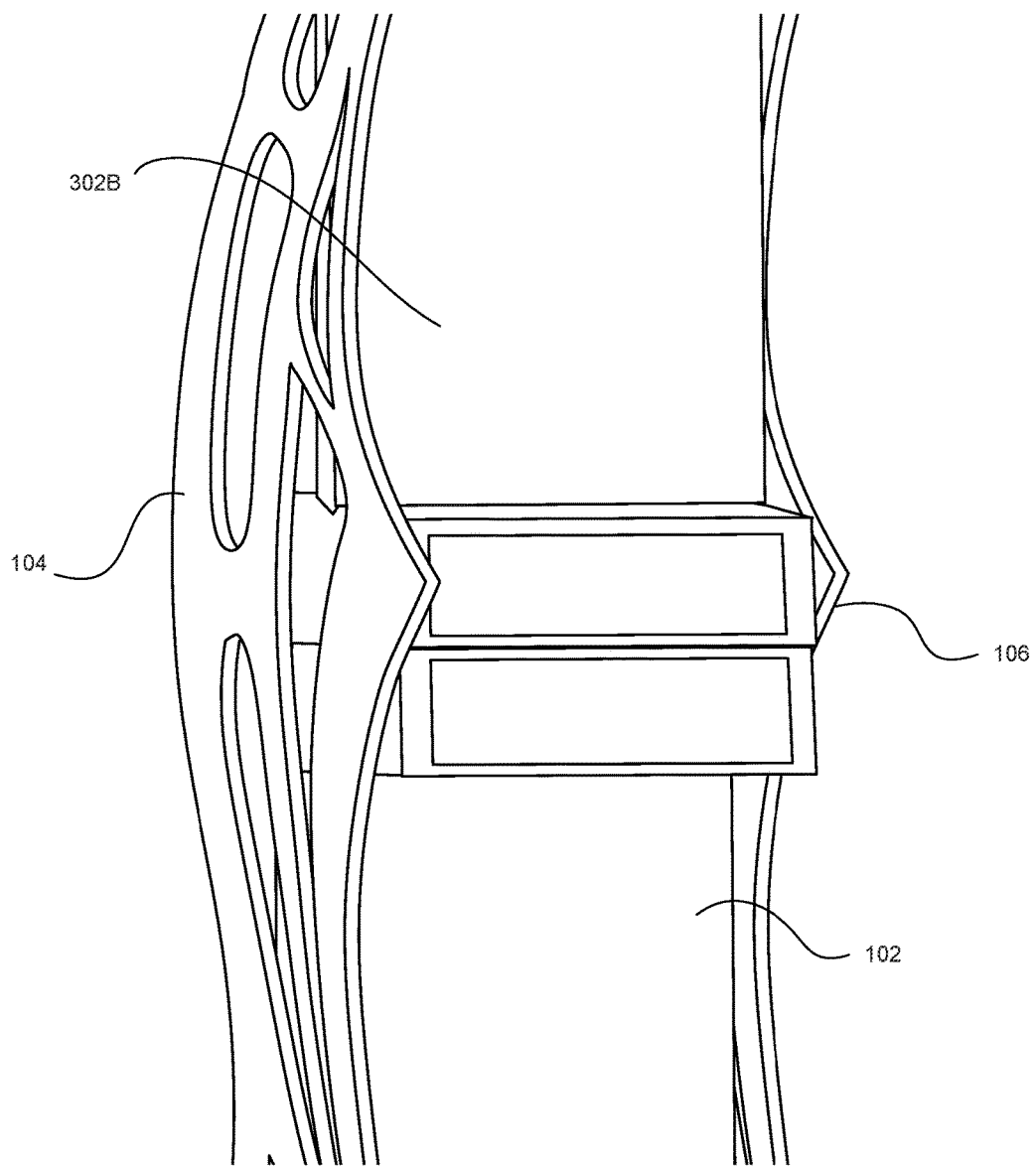

FIG. 1 illustrates a perspective view of an interactive entertainment kiosk 100 in accordance with some embodiments, and FIGS. 2A-2C illustrate a rear view of examples of the interactive entertainment kiosk in accordance with some embodiments. In some embodiments, the kiosk can include a chassis 102 including one or more translucent walls (e.g., made of plastic, glass, fiberglass, etc.) and one or more electronic device rack mounts (e.g., for mounting a computer, a laptop, a tablet, a video game console, a virtual reality console, an audio receiver, an amplifier, etc.). The kiosk can further include one or more light sources (e.g., light sources capable of emitting multiple colors of light in succession) configured to emit light through the one or more translucent walls of the chassis 102. In some embodiments, the kiosk can be configured to easily allow a user to share any content created by the kiosk (e.g., photos, videos, recordings of karaoke performances, recordings of video game sessions, etc.) via email, social media, Bluetooth, Wi-Fi, and/or short messaging service (SMS), among other possibilities.

In some embodiments, a first side of the kiosk (e.g., a front side of the kiosk) can include a user display mount (e.g., for a touch screen monitor or other display such as user display 300), rotatable at least 90 degrees between a portrait mode and a landscape mode, and a camera mount (e.g., configured to mount a camera 304, such as a smartphone camera, a point-and-shoot camera, a web camera, a digital single-lens reflex (DSLR) camera, etc.). In some embodiments, the camera mount is adjustable to change a shooting direction of a mounted camera (e.g., the kiosk can automatically control the shooting direction according to user input at one or more input devices of the kiosk). A second side of the kiosk, opposite the first side of the kiosk, can include a service display mount (e.g., for a service display 302A, such as a tablet, etc.).

As illustrated in FIGS. 2B-2C, in some embodiments, service display 302 can also be rotatable at least 90 degrees between a portrait mode and a landscape mode. FIG. 2B illustrates the kiosk having a service display 302B in a landscape mode, whereas FIG. 2C illustrates the kiosk having the service display 302B in a portrait mode. It should be understood that a display such as user display 302B shown in FIGS. 2B-2C can also be used as a user display.

In some embodiments, the kiosk can further include a first side panel 104 (e.g., support structure for the kiosk) on a third side of the kiosk, and a second side panel 106 (e.g., support structure for the kiosk) on a fourth side of the kiosk, wherein the third and fourth sides are different from the first and second sides. In some embodiments, some or all of the side panels can be translucent to allow light sources of the chassis 102 to emit light through the side panels.

Figure 3:
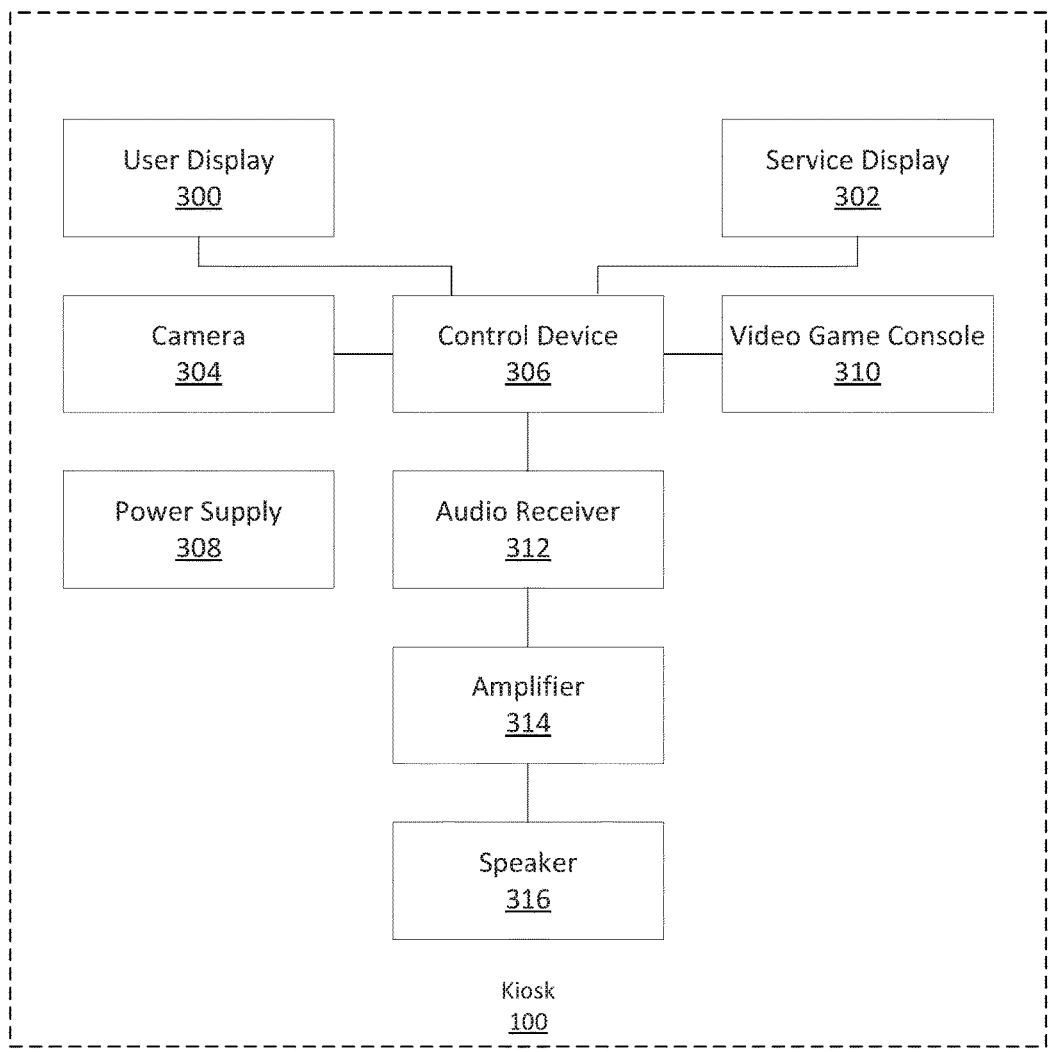
FIG. 3 is a block diagram of an exemplary interactive entertainment kiosk in accordance with some embodiments.

FIG. 3 is a block diagram of an exemplary interactive entertainment kiosk in accordance with some embodiments, showing electronic components of the kiosk. In some embodiments, a user display 300 and a service display 302 can be in communication with a control device 306. As discussed above, the user display 300 (e.g., a touchscreen display or a monitor) can be mounted to the kiosk via the user display mount, and the service display 302 (e.g., a touchscreen display, such as a tablet computer) mounted to the kiosk via the service display mount. In some embodiments, the control device 306 and the service display 302 can be coupled together, for example, in a tablet device or laptop. The control device 306 can be further in communication with the camera 304 mounted to the kiosk via the camera mount. In some configurations, camera 304 can comprise a camera bar, which may include multiple cameras, for example, arranged in an array. The control device 306 itself can be mounted within the chassis 102 via an electronic device rack mount of the chassis.

The user display 300 can be configured to display a user interface (UI) for users of the kiosk. For example, the user display can display a photo booth user interface (e.g., generated by the control device 306 and including one or more images captured by the camera 304) in a photo booth mode, a video game user interface (e.g., generated by the video game console 310) in a video game mode, a virtual reality mode (e.g., generated by a virtual reality console or the video game console 310) and/or a karaoke user interface (e.g., generated by the control device 306 or a separate karaoke device) in a karaoke mode, among other possibilities.

The control device 306 may act as a display switch for connected electronic devices. For example, in some embodiments, the control device 306 can cause the video game console 310 to display on the user display 300 in a video game mode, and a photo booth user interface (including images captured by the camera 304) to be displayed on the user display 300 in a photo booth mode, among other possibilities.

The service display 302 can be configured to display a service user interface (e.g., generated by the control device 306) for an operator of the kiosk. For example, the service user interface can allow an operator to switch modes of the kiosk, to capture photos/videos using the camera 304, to configure available modes and software, and to perform maintenance on the kiosk, among other possibilities.

In some embodiments, one or more additional electronic devices can be mounted within the chassis 102 via electronic device rack mounts. For example, a video game console 310, an audio receiver 312, an amplifier 314, and/or one or more speakers 316 may be mounted within the chassis 102 and in communication with the control device 306. Further, one or more of the electronic devices may receive power from a power supply 308 (e.g., a power strip and/or a battery pack, among other possibilities) mounted within the chassis 102. In some embodiments, further electronic devices may include a printing device in communication with the control device 306 (e.g., for printing photos/videos captured by the camera 304). In some embodiments, the video game console 310 may be connected directly to the user display 300. In some embodiments, the video game console 310 may be connected to a virtual reality headset. In some embodiments, the kiosk may further include a portable device dock (e.g., Universal Serial Bus (USB) interface, etc.) to allow a user to easily transfer content created by the kiosk to the user's portable device. In some embodiments, such transfer can be accomplished by integrated Wi-Fi, Bluetooth, and/or near field communication (NFC) capabilities, among other wired/wireless possibilities.

Figure 4:
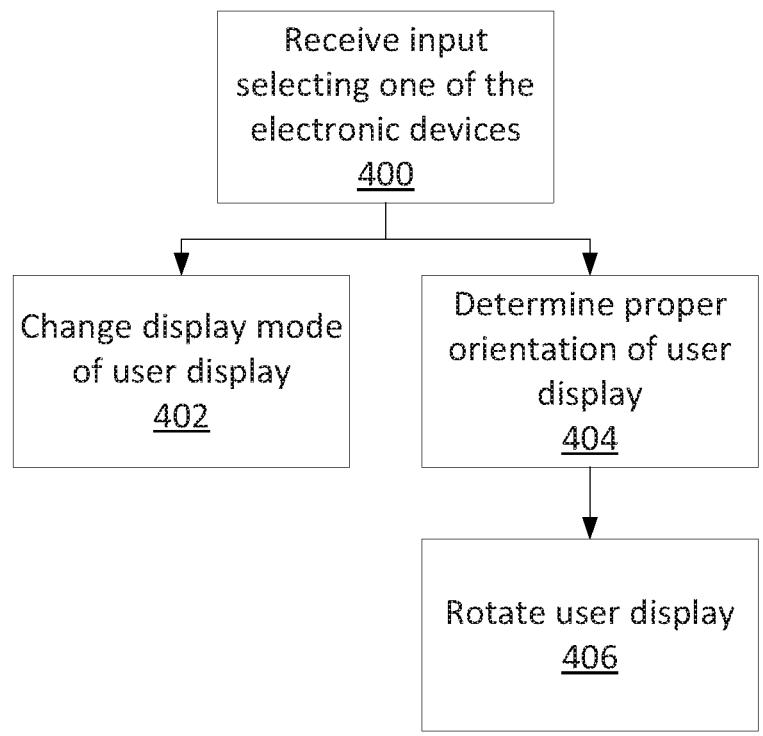
FIG. 4 is a flow diagram illustrating a method of receiving input selecting one of the electronic devices of an interactive entertainment kiosk in accordance with some embodiments.

FIG. 4 is a flow diagram illustrating a method of receiving input selecting one of the electronic devices of an interactive entertainment kiosk (e.g., as illustrated in FIGS. 1-3) in accordance with some embodiments. The kiosk 100 can receive (400) input (e.g., at a touchscreen of the service display 302) to select one of the plurality of electronic devices (e.g., the control device 306, the video game console 310, etc.) for display on a display (e.g., on the user display 300 and/or the service display 302). In response to the input, the kiosk can change (402) a display mode of the user display in accordance with the selected one of the plurality of electronic devices. For example, the user display 300 itself can receive a command to switch display input to the selected electronic device and/or the control device 306 can switch a display input source for the user display, among other possibilities.

In some embodiments, the input may select a mode (e.g., photo booth mode, video game mode, virtual reality mode, karaoke mode, etc.), and the control device 306 may determine a proper display mode in accordance with the selection. For example, in response to selection of a photo booth mode, the control device 306 may generate a photo booth UI for display on the user display 300, in response to selection of a karaoke mode, the control device 306 may generate a karaoke UI for display on the user display 300, in response to the selection of a virtual reality mode, the control device 360 may generate a karaoke UI, and/or in response to selection of a video game mode, the control device 306 may cause a UI generated by the video game console 310 to be displayed on the user display 300.

In some embodiments, further in response to the input, the kiosk can determine (404) a proper orientation of the display, and automatically rotate (406) the display in accordance with the proper orientation. For example, if the input selects a video game mode, then the proper orientation can be determined as landscape, and the user display can be rotated to landscape mode, or if the input selects a karaoke mode or a photo booth mode, then the proper orientation can be determined as portrait, and the user display can be rotated to portrait mode. In some embodiments, a motor coupled to the kiosk (e.g., coupled to the control device 306), may receive a command to rotate the user display mount 90 degrees, which thereby causes the display attached to the mount to rotate 90 degrees.

Figure 5:
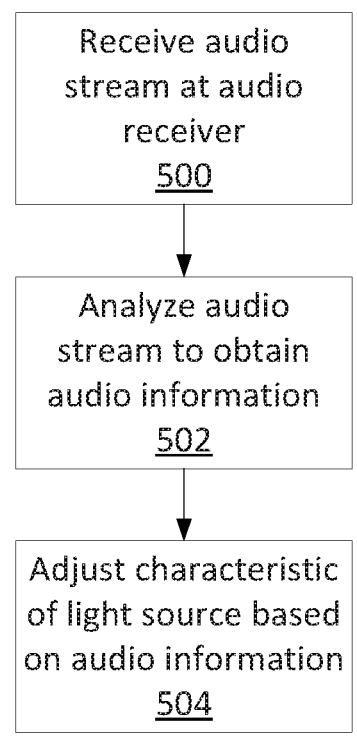
FIG. 5 is a flow diagram illustrating a method of automatically adjusting light sources in accordance with audio information of an interactive entertainment kiosk in accordance with some embodiments.

FIG. 5 is a flow diagram illustrating a method of automatically adjusting light sources in accordance with audio information of an interactive entertainment kiosk (e.g., as illustrated in FIGS. 1-3) in accordance with some embodiments. The kiosk 100 can receive (500) an audio stream at the audio receiver 312 (e.g., from the control device 306). The audio stream can be analyzed (502) (e.g., by the control device 306 or the audio receiver 312, etc.) to obtain audio information (e.g., amplitude, frequency, rhythm, etc.). Further, a characteristic of the light sources may be adjusted (504) based on the audio information (e.g., adjusting color, intensity, etc. of the light sources to vary according to the changing audio information).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. An entertainment kiosk, the kiosk comprises:
a chassis including one or more translucent walls and one or more electronic device rack mounts;
one or more light sources configured to emit light through the one or more translucent walls;
on a first side of the kiosk:
a user display mount, rotatable at least 90 degrees; and
a camera mount;
on a second side of the kiosk, opposite the first side of the kiosk:
a service display mounted;
a user display mounted to the kiosk via the user display mount;
a service display mounted to the kiosk via the service display mount; and
a control device configured to:
while displaying a user interface on the user display:
receive, at the service display, an input selecting a mode from a plurality of modes for the entertainment kiosk, wherein the plurality of modes for the entertainment kiosk comprises one or more of a photo booth mode, a video game mode, a virtual reality mode, and a karaoke mode; and
in response to receiving the input selecting the mode for the entertainment kiosk:
change a display mode of the user display in accordance with the selected mode,
determine a proper orientation of the user display based on the selected mode, wherein the proper orientation is one of a landscape orientation and a portrait orientation, and
automatically rotate the user display in accordance with the proper orientation of the user display based on the selected mode.

2. The entertainment kiosk of claim 1, the kiosk further comprises:
a first side panel on a third side of the kiosk; and
a second side panel on a fourth side of the kiosk, wherein the third and fourth sides are different from the first and second sides.

3. The entertainment kiosk of claim 1, the kiosk further comprises:
a camera mounted to the kiosk via the camera mount.

4. The entertainment kiosk of claim 3, wherein the camera comprises an array of cameras.

5. The entertainment kiosk of claim 4, the kiosk further comprises:
an electronic device mounted within the chassis via one of the electronic device rack mounts and in communication with the user display, the service display, and the camera.

6. The entertainment kiosk of claim 5, the kiosk further comprises:
an additional electronic device mounted within the chassis via another one of the electronic device rack mounts, wherein the additional electronic device is one of an audio receiver, an audio amplifier, a video game console, a virtual reality console, a printing device, and a power supply.

7. The entertainment kiosk of claim 1, the kiosk further comprises:
an audio receiver; and
the control device further configured to:
receive an audio stream at the audio receiver;
analyze the audio stream to obtain audio information; and
adjust a characteristic of the light sources based on the audio information.

8. The entertainment kiosk of claim 1, wherein automatically rotate the user display in accordance with the proper orientation comprises automatically rotating the user display from the landscape orientation to the portrait orientation or from the portrait orientation to the landscape orientation.

9. The entertainment kiosk of claim 8, wherein:
the proper orientation of the user display based on the photo booth mode comprises the portrait orientation;
the proper orientation of the user display based on the video game mode comprises the landscape orientation; and
the proper orientation of the user display based on the karaoke mode comprises the portrait orientation.

10. The entertainment kiosk of claim 1, wherein change the display mode of the user display in accordance with the selected mode comprises generating and displaying a respective user interface corresponding to the selected mode for the entertainment kiosk.

11. The entertainment kiosk of claim 10, wherein the respective user interface comprises:
a photo booth user interface corresponding to the photo booth mode;
a video game user interface corresponding to the video game mode;
a virtual reality user interface corresponding to the virtual reality mode; and
a karaoke user interface corresponding to the karaoke mode.

* * * * *